United States Patent [19]
Hamm et al.

[11] 3,982,991
[45] Sept. 28, 1976

[54] DEVICE FOR WELDING AND PARTING THERMOPLASTIC FOILS

[75] Inventors: Klaus Hamm, Stuttgart-Ost; Otto Beck, Stuttgart-Heumaden, both of Germany

[73] Assignee: Fr. Hesser Maschinenfabrik AG, Stuttgart-Bad Cannstatt, Germany

[22] Filed: Sept. 26, 1974

[21] Appl. No.: 509,426

Related U.S. Application Data

[63] Continuation-in-part of Ser. No. 305,949, Nov. 13, 1972, abandoned.

[30] Foreign Application Priority Data

Nov. 13, 1971 Germany............................ 2156485

[52] U.S. Cl. .................................. 156/515; 53/39; 156/251; 156/289; 219/243
[51] Int. Cl.² ..................... B32B 31/18; H05B 1/00
[58] Field of Search ........... 156/250, 251, 289, 306, 156/323, 510, 515, 518, 530, 580, 581, 583; 219/243, 245, 254, 538, 552, 553; 53/39, 379; 93/DIG. 1

[56] References Cited
UNITED STATES PATENTS

| | | | |
|---|---|---|---|
| 2,805,973 | 9/1957 | Klasing et al. | 156/251 |
| 3,033,257 | 5/1962 | Weber | 156/515 |
| 3,035,381 | 5/1962 | Hosso | 156/515 |
| 3,236,714 | 2/1966 | Traut | 156/323 |
| 3,409,494 | 11/1968 | Korzinek | 156/515 |
| 3,415,704 | 10/1968 | Bate | 156/515 |
| 3,457,132 | 7/1969 | Tuma | 156/251 |
| 3,551,259 | 12/1970 | Schwarzkopf | 156/583 |
| 3,593,000 | 7/1971 | Forma | 219/243 |

Primary Examiner—Douglas J. Drummond
Assistant Examiner—John E. Kittle
Attorney, Agent, or Firm—Edward E. Sachs

[57] ABSTRACT

Device for welding and parting thermoplastic foils to form bags or the like, having a pair of heated opposing tools arranged to close against foils introduced between them. The foils are welded and parted along a compression line formed between a compression edge of one tool and a hard, wear-resistant, but resilient surface of the opposing tool.

5 Claims, 3 Drawing Figures

DEVICE FOR WELDING AND PARTING THERMOPLASTIC FOILS

This application is a continuation-in-part of application Ser. No. 305,949, filed Nov. 13, 1972, and now abandoned.

The invention relates generally to a device for welding webs of thermoplastic foils, adapted for use as packaging material, and for parting or separating the webs at predetermined increments to form bags or the like.

In the prior art, devices for welding and parting thermoplastic foils are already known in the automatic, high production, packaging machinery in which a wire serving as a compression edge is stretched over a jaw with the opposing tool being in the form of a bracket coated with silicone rubber. Both the bracket and the wire are coated with a protective covering of polytetrafluorethylene and glass silk to prevent the heated foil from adhering thereto. When the two tools of the device move toward each other, the foil introduced between them is heated by the wire until the latter passes through the foil and is partly imbedded in the silicone rubber of the bracket. This causes grooves to form in the silicone rubber and produces seams in the foil which are not always satisfactory. When the wire in a device as described above is coated with polytetrafluorethylene and the bracket is covered with a protective coating of glass silk impregnated with polytetrafluorethylene, the resulting seams have improved strength properties, but the coating on the wire is subject to considerable wear. This often causes shutdowns of such packaging machinery after a relatively short period of use.

The primary object of the present invention is to provide a device for welding and parting of thermoplastic foils, as used in packaging machinery, in which the life of the welding and parting tool is appreciably increased and the production of fault-free and neat seams is facilitated. Moreover, adhesion of the softened foil is prevented.

These objectives are accomplished and an aspect of the invention resides in providing a device for welding and parting webs of thermoplastic foil which includes a temperature responsive parting and welding tool provided with a compression edge; and an opposing tool adapted for moving towards and away from the first tool. The opposing tool having a resilient pressure pad and a thin resilient strip covering the pad and facing the compression edge.

For a better understanding of the present invention, together with other and further objects thereof, reference is had to the following description taken in connection with the accompanying drawing, and its scope will be pointed out in the appended claims.

Figure 2:
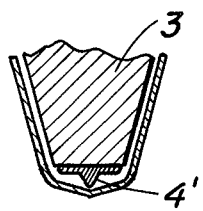
FIGS. 2 and 3 are similar views of a modified opposing tool.

Referring now to the drawing, a welding and parting tool 1 is shown in an opposing relationship to a tool 2. The tool 1 and the opposing tool 2 are arranged for relative movement in a manner to obtain opening and closing of the gap therebetween by a means not shown. The tool 1 comprises a jaw 3 over the lower end of which is clamped a wire 4. The wire 4 is heated by a heater element 5 incorporated into the jaw 3. The jaw 3 and the wire 4 are protected with a layer 6 in order to prevent adhesion of foils 7,8, disposed between tool 1 and tool 2, during the welding and parting operation. The layer 6 is formed of polytetrafluorethylene and glass silk or of some other material having similar properties.

The opposing tool 2 comprises a jaw 9 lined with a pressure pad 10 made of rubber or other resilient material at the end facing the tool 1 and embedded in tool 2. The pad 10 is covered with a stiff or hard strip 11 made, for example, of a metal suitable for leaf springs. The strip 11 and part of the jaw 9 are covered with a layer 12 to prevent adhesion of the softened foil material to the strip 11. The layer 12 is similar to the layer 6 of the tool 1. The strip 11 may be heated if necessary by a heating element 13 incorporated into the jaw 9.

The strip 11 constitutes a wear-resistant pressure equalizing plate which facilitates the welding operation. The wire 4 cannot become embedded in the strip 11 even after long periods of operation. The strip 11 is resiliently disposed by bearing against pad 10 which makes it possible to transmit localized pressure, or pressure applied to a narrow area, by wire 4, to the total abutting contact surface of the pad 10 in a substantially uniform manner all across the surface even though curvatures may exist in work elements of tool 1 or opposing tool 2.

The designation that the strip 11 is "stiff" or "hard" denotes that the strip is structurally rigid. Such rigidity is required to distribute the pressure imparted upon it by wire 4, during operational contact therewith, so that no indentation or projection occurs into the resilient pad 10. Preferably, such distribution is substantially uniform. The hardness or thickness of strip 11 is chosen to accomplish this requirement. In the absence of such rigidity the wire 4 causes the strip 11 to protrude into the resilient pad which defeats the present invention, for comparison please note U.S. Pat. No. 3,409,494.

In operation, the webs of thermoplastic foils 7,8 are welded together and simultaneously parted at predetermined increments by means of wire 4. The webs are introduced between the welding and parting tool 1 and the opposing tool 2. Tool 1 and opposing tool 2 are then moved toward each other so that the foils 7,8 are compressed along a narrow transverse zone and deformed by tool 1 and opposing tool 2 due to softening caused by heating. Parting of foils 7,8 occurs along the line of compression and foils 7,8 are welded together along the parted edges thereby creating separate containers (not shown). The seam thus established is transverse to the length of the web, uniform and continuous.

The wire 4, as well as the modifications thereof shown in FIGS. 2 and 3 and discussed below, which constitutes the web parting and welding edge, is constructed structurally rigid to prevent any appreciable deformation of wire 4. The term "rigid" denotes that wire 4 need not change its configuration during the operation thereof as is required or desired in devices in which the backing jaw is provided with a resilient pad and the wire protrudes thereinto, for instance see U.S. Pat. No. 3,409,494.

Figure 3:
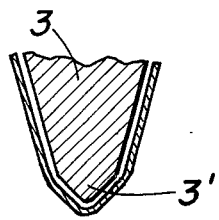
Figure 1:
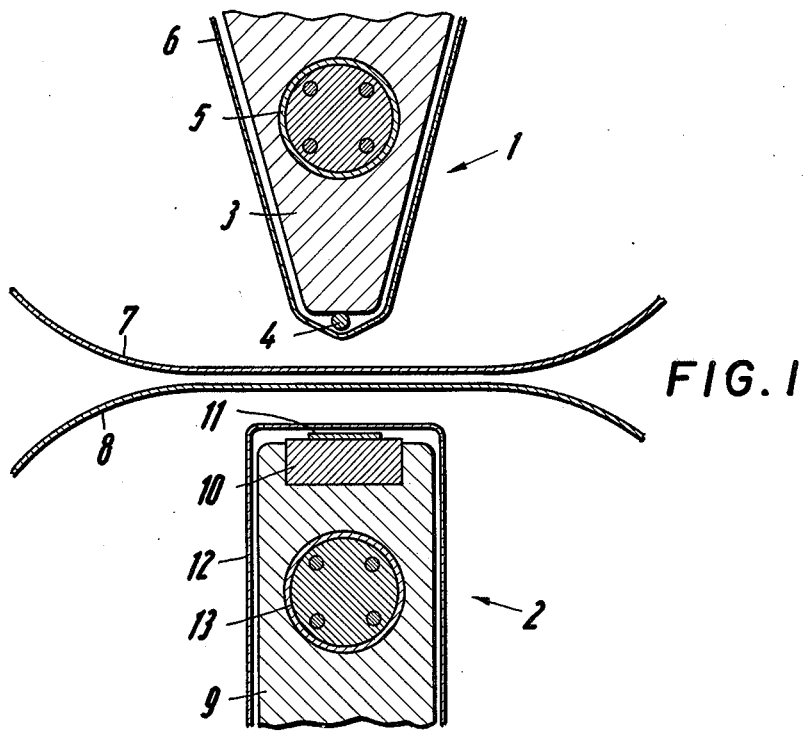
FIG. 1 is a fragmentary vertical cross section of a welding tool.

As a modification the wire 4 may be formed as a bead or profiled strip, see 4' of FIG. 2, or form an integral part of the jaw and more particularly the lower end thereof, see 3' of FIG. 3, to provide a compression edge effective to weld and sever the foils 7 and 8.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A device for seam welding and parting layer of webs of thermoplastic foils, comprising:
   a first tool comprising a jaw member provided with an end face, an electrically responsive heating element in contact with said jaw member, a structurally rigid web parting and welding edge on said end face, and a protective layer extending at least partly around said edge;
   a second tool comprising an opposing jaw member placed in juxtaposition to said first tool and having an end face located opposite the jaw end face of said first tool, a pressure pad of resilient elastomeric material secured on the said face of said second tool, a rigid metal pressure equalizing plate on said pad facing said edge, said plate being effective to translate localized pressure derived from said web welding and parting edge into substantially uniform pressure distributed across the abutting surface of said pad;
   and a protective layer extending over both the pad and the plate of said second tool;
   each of said protective layers being composed of a material having properties preventing the adherence of said foils thereto;
   whereby upon heat and pressure contact between said first and second tool said edge is effective to weld together a plurality of web layers to create a seam and simultaneously part or separate such layers from the web to establish a container.

2. A device according to claim 1, wherein said edge is structurally secured to said jaw.

3. A device according to claim 1, wherein said jaw is profiled and said edge forms an integral part of said jaw.

4. A device according to claim 1, wherein said heating element is constructed and arranged to establish said edge.

5. A device according to claim 1, wherein said plate is composed of leaf spring steel.

* * * * *